March 25, 1958    F. S. SIMPSON    2,827,748
LAWN EDGER AND TRIMMER
Filed May 4, 1954    2 Sheets-Sheet 1
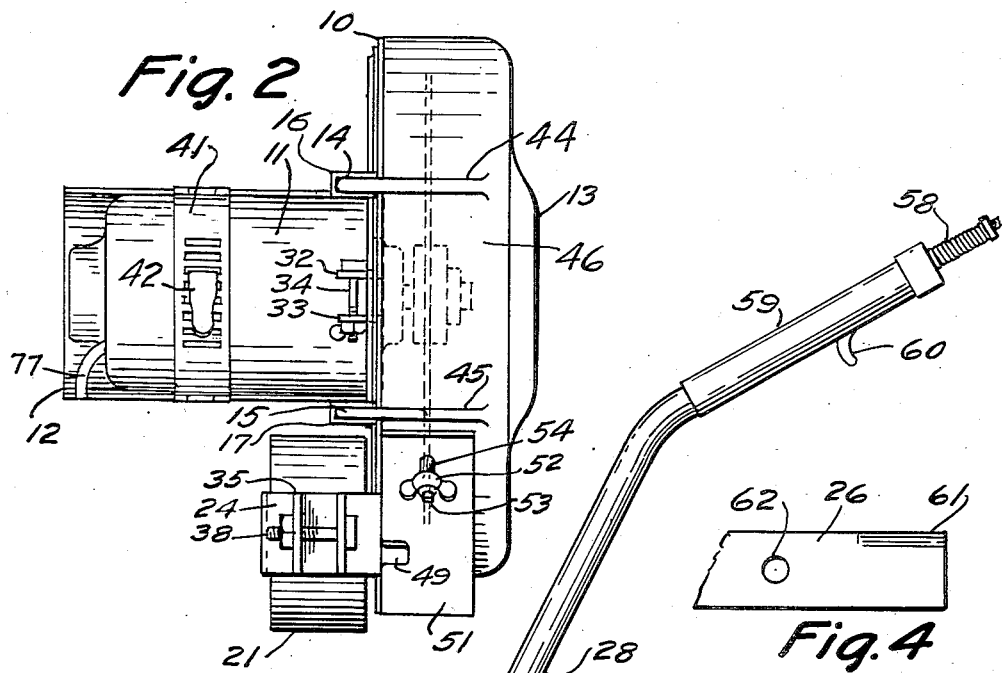
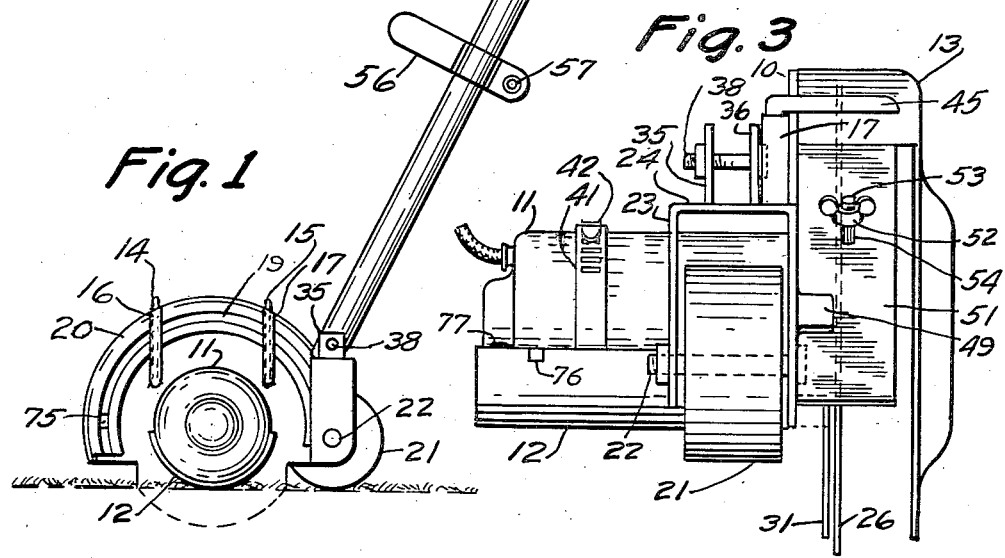
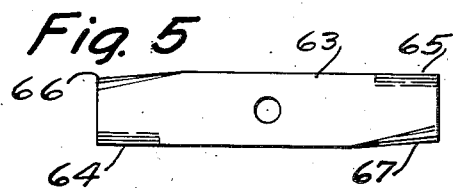
INVENTOR
FREDERICK S. SIMPSON
BY *[signature]*
ATTORNEY March 25, 1958
F. S. SIMPSON
2,827,748
LAWN EDGER AND TRIMMER
Filed May 4, 1954
2 Sheets-Sheet 2
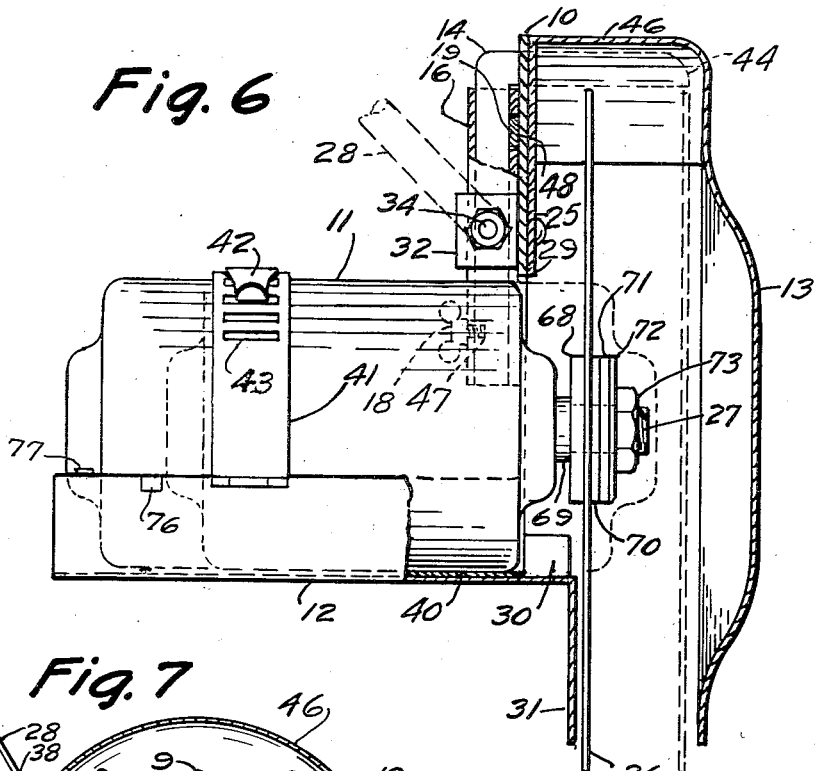
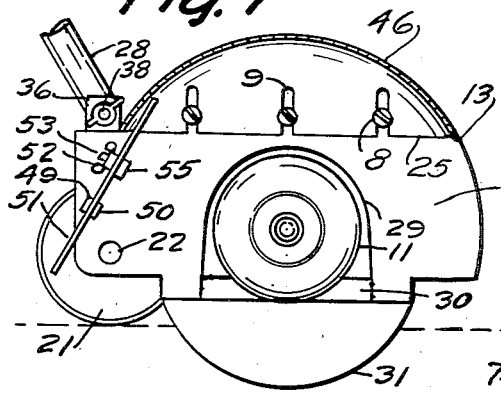
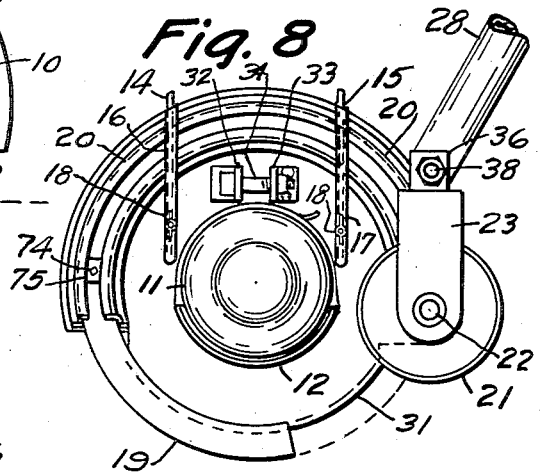
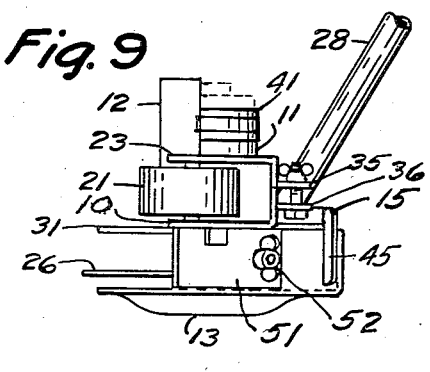
INVENTOR
FREDERICK S. SIMPSON
BY James Harrison Bowen
ATTORNEY United States Patent Office 2,827,748
Patented Mar. 25, 1958

2,827,748

LAWN EDGER AND TRIMMER

Frederick S. Simpson, Seattle, Wash.; Dorothy E. Simpson, executrix of said Frederick S. Simpson, deceased, assignor to Dorothy E. Simpson, individual Application May 4, 1954, Serial No. 427,410

3 Claims. (Cl. 56—25.4)

This invention relates to grass cutting, trimming and edging machines, and in particular a small machine adapted to be used for trimming around the edges of walks and shrubbery with a cutting blade in a vertical position and also for trimming shrubbery and grass around plants and trees with the cutter in a horizontal position.

Various types of lawn edgers and trimmers have been provided and most of these are adapted to be held in various positions. However, with conventional edgers or trimmers for this use it is difficult to cut horizontally disposed grass hanging over the edge of a walk or the like, and it is also difficult to both trim and cut a trench along the edge of a walk or the like with the same machine. With this thought in mind this invention contemplates a lawn edger and trimmer having a cutting blade mounted on a motor shaft with the motor mounted in a cradle extended from a mounting plate or frame and adapted to be held with a handle in which the handle is adapted to be attached to the mounting plate at one point for retaining the parts with the cutting blade in a vertical position and at another point for cutting with the blade in a horizontal position.

The object of this invention is, therefore, to provide means for forming a combination lawn edger and trimmer whereby the cutting blade is adapted to operate in both vertical and horizontal positions.

Another object of the invention is to provide a lawn edger that is adapted to cut horizontally disposed blades of grass such as extend over the edge of a walk or the like.

Another object of the invention is to provide an improved lawn edger that removes all sod, grass, dirt and the like at the edge of a walk whereby a clean open trench is provided.

A further object of the invention is to provide an improved lawn trimmer which includes a cutting blade carried by a motor shaft in which the motor with a blade mounted on the shaft thereof is longitudinally slidable in a cradle to facilitate trimming in both vertical and horizontal planes.

A still further object of the invention is to provide a combination lawn edger and trimmer which is of a simple and economical construction.

With these and other objects and advantages in view the invention embodies a motor secured in a cradle lined with resilient material and having a cutting blade on one end of the motor shaft, a shield positioned over the blade, a guard adjustably mounted at one end of the shield, a roller mounted in a bracket at one side of the motor, and a handle adapted to be attached to the motor supporting elements at suitable points for either vertical or horizontal cutting.

Other features and advantages of the invention will appear from the following description taken in connection with the drawings, wherein:

Figure 1 is an elevational view showing the device as it appears in use with the parts shown on a relatively small scale and with cutting blade in a vertical position.

Figure 2 is an enlarged plan view of the combination lawn edger and trimmer with the handle removed.

Figure 3 is a front elevational view of the device shown in Figure 2 with the track omitted and with the cutting blade in the vertical position.

Figure 4 is a detail showing a portion of one of the cutting blades with one end of the blade broken away and with the blade shown on an enlarged scale.

Figure 5 is a view similar to that shown in Figure 4 showing a modification wherein a blade is provided with angularly disposed tips forming fan blades for blowing cut grass and the like from the machine.

Figure 6 is a front elevational view similar to that shown in Figure 3, with the parts shown on an enlarged scale, and with parts broken away showing a longitudinal section through the motor cradle and shield illustrating the mounting of the blade and motor.

Figure 7 is an end elevational view of the machine looking toward the end on which the shield is positioned, the body of the shield being broken away and shown in section.

Figure 8 is an end elevational view of the machine looking toward the end on which the motor and cradle are positioned showing a circular plate providing a horizontal guard partly withdrawn from a track in which it is mounted.

Figure 9 is a front elevational view similar to that shown in Figure 3, with the parts shown on a reduced scale, and illustrating the machine with the cutter in a horizontal position.

Referring now to the drawings wherein like reference characters denote corresponding parts the improved combination edger and trimmer of this invention includes a mounting plate 10, a motor 11 positioned in a substantially semi-circular cradle 12, a shield 13 supported by arms 14 and 15 slidably mounted in vertically disposed channels 16 and 17 welded to one surface of the plate 10, screws 18 threaded in the channels for clamping the arms in adjusted positions therein, a circular guard 19 adjustably mounted in circular rails providing a track 20, a roller 21 rotatably mounted by a bolt 22 with one end of the bolt positioned in the plate 10 and the other in an arm 23 the upper end of which is connected with a section 24 to the plate 10, a reinforcing plate 25, extended from the shield 13 and positioned against the other surface of the plate 10, a cutting blade 26 carried by a motor shaft 27, and a handle 28. The channels 16 and 17 extend through a portion of the circular rails 20 with the guard 19 positioned between the arms 14 and 15 and the surface of the plate 10.

The mounting plate 10 is provided with an opening 29 through which the motor 11 is adapted to pass in adjusting the machine from vertical to horizontal cutting, and the lower part of the plate is provided with a rectangular-shaped bar providing a stiffener 30, and also an edging guide 31 which extends downwardly, as shown in Figures 6 and 7 to protect the cutting blade.

The mounting plate 10 is also provided with spaced lugs 32 and 33 between which the lower end of the handle 28 is secured by a bolt 34 when the dveice is used with the cutting blade in a horizontal position, as shown in Figure 9.

The upper section 24 of the arm 23 in which the roller 21 is mounted is provided with spaced ears 35 and 36 between which the lower end of the handle is pivotally mounted with a bolt 38 when the machine is used as an edger with the blade in a vertical position, as shown in Figures 1 and 3.

The edging or horizontal guard 19 is slidably mounted in the track 20 and may be nested in the track, sliding through slots 48 in the inner portions of the channels 16 and 17, as shown in Figure 6, when not in use, and may be extended as shown in Figure 8, in which it is partially withdrawn, when the device is used in a horizontal position. The guard 19 is clamped in adjusted positions by a screw 74 threaded in a plate 75.

The mounting plate 10 is also provided with spaced pins 8 that extend into slots 9 in the reinforcing plate 25 of the shield 13 to retain the shield in position on the mounting plate.

The cradle 12 is lined with a layer of rubber or other resilient material, as indicated by the numeral 40, and a clamping band 41, which is provided with a clamping lever 42, is also lined with rubber or other resilient material. The ends of the band 41 are connected to the edges of the cradle, as shown in Figure 6. With the motor spaced from the supporting and clamping parts by the resilient material the vibrations transmitted to the handle are reduced to a minimum.

The arms 14 and 15 are provided with horizontally disposed sections 44 and 45 which are integral with the section 46 of the shield 13, and the lower parts of the arms, which are slidably mounted in the channels 16 and 17, are provided with notches 47 that are positioned to register with the thumb screws 18 whereby the arms and shield are secured in position on the mounting plate.

With the arms 14 and 15 securely held on the outside or upper part of the mounting plate, with the cutter in the horizontal position, and the reinforcing plate 25, on the inner or lower side, the shield is positively held in position, and at the same time, may readily be removed, as desired.

The motor is clamped in the cradle 12 with the band 41 and the ends of the band are secured in clamping relation with the clamping lever 42 that extends through slots 43 in one section of the band.

The mounting plate is also provided with spaced tabs 49 and 50 between which one side of a guard 51 is positioned, the guard being held in place with a thumb nut 52 which is threaded on a stud 53 that extends through a slot 54, whereby the guard is retained in position to prevent cut grass being thrown on an operator of the machine. The stud 53 is secured in a lug 55 that extends from the plate 10.

The handle 28 is provided with an adjustable grip 56 that is clamped to the handle with a thumb screw 57, and the upper end of the handle, from which the electric cord 58 extends, is provided with a friction gripping sleeve 59, and a switch lever or button 60.

The cutting blade 26 is provided with oppositely disposed cutting edges 61, and a centrally positioned opening 62, through which the motor shaft 27 extends. The machine may also be provided with a blade 63 having oppositely disposed cutting edges 64 and 65, as illustrated in Figure 5, and with the opposite edges extended upwardly providing fan-like tips 66 and 67. The blade 63 is particularly adapted for use in the machine when the device is used for horizontal cutting.

The blades are mounted on the motor shaft, as illustrated in Figure 6, with a soft metal washer 68, such as a washer made of brass or bronze, positioned against a shoulder 69, and with a similar washer 70 positioned against the opposite side of the blade. A resilient disc 71, such as a washer made of rubber, is positioned against the washer 70, and a metal, such as a steel, washer 72 positioned against the disc 71. The parts are retained in clamping relation with the blade with a nut 73 threaded on the end of the shaft 27.

With the cutting blades mounted in this manner a blade is free to slip upon engagement of the cutting edge with a rock or other fixed obstruction whereby danger of the blade breaking upon striking a rock or the like is substantially eliminated. The blades are interchangeable so that either blade may be used as may be desired.

The shield 13 is adjustable vertically by sliding the arms 14 and 15 in the channels 16 and 17, and the shield may readily be removed by loosening the thumb screws 18.

The motor is adapted to slide longitudinally in the cradle 12 to change the machine from a vertically disposed edger to a horizontally disposed cutter, and one side of the cradle is provided with a notch 76 into which a lug 77, extended from the motor housing, is adapted to be held with the motor in position for horizontal cutting.

As shown in Figure 7, the motor is adapted to slide in a recess in the stiffening member 30.

The handle is also adapted to be readily changed from one position to another, such as from the position shown in Figure 8 to that shown in Figure 9. The combination lawn edger and trimmer of this invention is, therefore, adapted for universal use and answers substantially all requirements in trimming and finishing a lawn or the like.

With the parts, particularly as shown in Figure 6, it is preferred to run the motor counter-clockwise, however, it will be understood that the motor is adapted to be rotated in either direction.

It will be understood that the mounting plate, cradle, shield, handle and other parts may be of other suitable shapes and designs, and the handle may be of any other length, or may be attached to the machine by other means.

It will be understood that modifications, within the scope of the appended claims, may be made in the design and arrangement of the parts without departing from the spirit of the invention.

What is claimed is:

1. In a lawn edger and trimmer, the combination which comprises a vertically positioned mounting plate having rear and front surfaces with a circular upper portion and having an opening therethrough, the opening extending upwardly from the lower edge, a motor carrying cradle substantially semi-circular in cross section extending from the rear surface of the mounting plate, a substantially circular shield carried by the mounting plate and spaced from the front thereof, a motor positioned in the cradle and mounted to slide longitudinally thereof, said motor having a shaft, a circular cutting blade mounted on the motor shaft and positioned between the mounting plate and shield, a band mounted in the cradle for clamping the motor in adjusted positions in the cradle whereby the cutting blade is retained in different distances from the mounting plate and shield, respectively, a roller rotatably mounted on the mounting plate and positioned to space the cutting blade in relation to the ground, and a handle mounted on and extended from the mounting plate.

2. In a lawn edger and trimmer, the combination which comprises a vertically positioned mounting plate having front and rear surfaces with a circular upper portion and having an opening therethrough, the opening extending upwardly from the lower edge, a motor carrying cradle substantially semi-circular in cross section extending from the rear surface of the mounting plate and positioned on the lower portion thereof, a substantially semi-circular overhanging shield carried by the mounting plate and spaced from the front thereof, a motor positioned in the cradle and mounted to slide longitudinally thereof, said motor having a shaft and said shaft being positioned to extend through the opening in the lower edge of the mounting plate, a circular cutting blade mounted on the motor shaft and positioned between the mounting plate and shield, means for clamping the motor in adjusted positions in the cradle whereby the cutting blade is retained in various positions between the mounting plate and shield, an arm carried by and spaced from the rear surface of the mounting plate, a roller rotatably mounted in the mounting plate and arm spaced from the mounting plate, spaced ears parallel to the mounting plate extended from the arm carried by and spaced from the mounting plate, spaced lugs extended from the rear surface of the mounting plate and positioned in planes perpendicular to the mounting plate, and a handle formed to be positioned, selectively, between the spaced ears or between the spaced lugs whereby the cutting blade may be used, selectively, in a vertical or in a horizontal position.

3. In a lawn edger and trimmer, the combination which comprises a vertically positioned mounting plate having front and rear surfaces and having an opening extended through the lower part, a motor carrying cradle substantially semi-circular in cross section extending from the rear surface of the mounting plate and positioned on the lower portion thereof, an overhanging shield carried by the mounting plate and spaced from the front thereof, a circular track positioned on the rear surface of the mounting plate, a circular guard slidably mounted in said track and positioned to extend below the mounting plate, said mounting plate having spaced parallel channel members positioned on one surface thereof and extended through the track and said shield having arms extended into the channel members providing the mounting means of the shield on the mounting plate, a motor positioned in the cradle and mounted to slide longitudinally thereof, said motor having a shaft and said shaft extending through the mounting plate, a circular cutting blade positioned between the mounting plate and shield and mounted on the motor shaft, means on said cradle for clamping the motor in adjusted positions in the cradle, a roller mounting arm carried by and spaced from the mounting plate, a roller rotatably mounted between the mounting plate and roller mounting arm, a handle, and pairs of handle mounting elements extended from parts of the edger and trimmer, one pair of said handle mounting elements being positioned at a right angle to another pair thereof.

References Cited in the file of this patent

UNITED STATES PATENTS

| | | |
|---|---|---|
| 2,612,741 | McKay | Oct. 7, 1952 |
| 2,653,381 | Rooke | Sept. 29, 1953 |
| 2,672,002 | Nelson | Mar. 16, 1954 |
| 2,708,335 | Newton | May 17, 1955 |
| 2,718,743 | Smith et al. | Sept. 27, 1955 |
| 2,722,095 | Farney | Nov. 1, 1955 |